INVENTORS:
ROBERT H. KOLB
DONALD W. BARRY
RONALD P. NORDGREN
DOUGLAS E. BROUSSARD

BY: *J. H. McCarthy*
THEIR AGENT

INVENTORS:
ROBERT H. KOLB
DONALD W. BARRY
RONALD P. NORDGREN
DOUGLAS E. BROUSSARD

BY: *A. H. McCarthy*
THEIR AGENT

United States Patent Office 3,546,888
Patented Dec. 15, 1970

3,546,888
HEADING CONTROL SYSTEM FOR A PIPELAYING VESSEL
Robert H. Kolb, Cypress, Tex., Donald W. Barry, Centralia, Ill., and Ronald P. Nordgren and Douglas E. Broussard, Houston, Tex., assignors to Shell Oil Company, New York, N.Y., a corporation of Delaware
Filed Oct. 30, 1968, Ser. No. 771,964
Int. Cl. F16l 1/00; B65h 17/24
U.S. Cl. 61—72.3
10 Claims

ABSTRACT OF THE DISCLOSURE

A method of laying an offshore pipeline along a preselected route from a vessel having a pipe supporting structure extending outboard of said vessel for directing a pipeline into the water, wherein the vessel heading is partially rotated and so maintained as the vessel is moved along the route in order to alleviate the stresses in the structure caused by transverse water forces acting on the pipeline.

BACKGROUND OF THE INVENTION

This invention relates to an apparatus for controlling a pipelaying vessel or barge and more particularly to a method and apparatus for controlling the vessel heading so that it is maintained substantially in alignment with the suspended span of pipe being laid particularly in those cases when the vessel and the pipe are subjected to sideways water forces, such as those arising from currents and wave action.

In conventional offshore pipelaying operations, a pipeline is maintained under tension as described in the U.S. patent to Cox et al., 3,331,212, dated July 18, 1967 and is payed out over the stern of a pipelaying vessel or barge where it is there guided along a pipe supported structure or "stinger" attached to the barge, and onto the floor of a body of water. The pipeline may be assembled from pipe lengths on board the vessel or it may be preassembled onto a spool which is rotatably carried on the pipelaying barge. Frequently, the pipe laying vessel, the stinger and the unsupported section of the pipeline extending from the stinger to the water floor are subjected to water currents or wave action acting transversely. These water forces acting on the unsupported section of the pipeline create transverse drag forces which cause undesirable shear loads and bending moments at the point where the pipeline leaves its support structure. These loads not only tend to bend the pipeline, but also act along with the drag forces acting directly on the stinger to produce large bending moments in the support structure. These forces may in fact become of a sufficient magnitude to cause damage to either the support structure or the pipeline or both. Accordingly, there exists a need for a method and apparatus for laying pipeline when the laying system is subject to crossways water forces that alleviates the bending moment produced in the pipeline and the support structure as a result of these forces. Even in the absence of sideways currents it is important to maintain the alignment of the vessel with the pipeline suspended over the stern to avoid excessive bending moments in either the pipeline or the stinger.

For any given combination of pipe size, stinger construction, and joint rigidity, there is a specific relationship between elastic deflections or displacements and the existing causative forces and moments. Therefore, in the description of this invention it will be understood that the measurement or control of any forces or moments is synonymous with the measurement or control of the related linear or angular elastic deflection or displacement and vice-versa.

SUMMARY OF THE INVENTION

In accordance with the method of the subject invention, the heading of the pipelaying vessel or barge is partially rotated to produce the optimum alignment with the supported pipe span. In the presence of side currents, this involves turning the bow of the vessel somewhat in the direction of the sideways water currents. The degree of heading change desirable will be dependent upon a number of variable such as the current velocity, the depth of the water and the stiffness of the pipe and will be determined by means of suitable force or displacement measuring devices in the stinger structure. Once the heading is established, the pipelaying vessel is moved along in the direction of the pipeline route while maintaining the vessel heading in the desired rotated or yawed attitude.

In accordance with the apparatus of the invention, the pipe supporting structure attached to the stern of the pipelaying vessel is provided with suitable sensing means for noting the magnitude and direction of the forces applied by the pipe to the support structure, or for noting the magnitude and direction of the bending moment in the structure at its point of attachment to the vessel or both, so that a suitable change in the vessel heading can be made. This invention may be used to advantage with either the laterally rigid stingers now in current use and disclosed in U.S. application Ser. No. 600,196, filed Dec. 8, 1966 or with the elastically flexible hinged stinger which is the subject of U.S. patent application Ser. No. 797,804, filed Feb. 10, 1969.

A primary object of the method according to the invention is to orient the heading of a pipelaying vessel having a pipe supporting structure for directing the pipeline into the water in a manner to alleviate the deleterious effects of transverse water forces and of misalignment with the suspended span of pipe.

Another object of the method, when side currents are present, is to partially rotate the heading of the vessel in the direction of the sideways water forces in order to reduce the bending moments in the pipeline and pipe supporting structure.

Still another object of the method is to lay a pipeline along a preselected route on the water floor while maintaining the vessel heading rotated away from the route heading in the direction of the water forces.

A further object of the invention is to provide apparatus associated with the pipe support structure to sense the magnitude of the forces and moments and/or deflections created by misalignment and by sideways water currents. These and other objects will become apparent from a reading of the following detailed description of the invention taken in conjunction with the accompanying drawings.

DESCRIPTION OF THE PREFERRED EMBODIMENT

Figure 1:
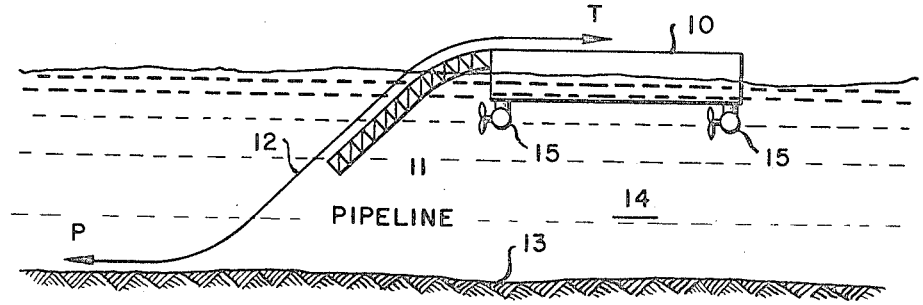
FIG. 1 is an elevational view of a pipelaying vessel laying a pipeline on the floor of a body of water using a vertically curved stinger which may be either laterally rigid or laterally flexible.

FIG. 1 illustrates a conventional pipelaying system in which a pipelaying vessel 10 having a pipe support structure or so-called "stinger" 11 attached to the stern thereof is employed for paying out a pipeline 12 onto the floor 13 of a body of water 14. The pipelaying vessel 10 may be of any known type in which the pipeline is either fabricated on board the vessel 10 and then payed out over the pipe support structure 11 or is preassembled on a reel which is rotatably mounted on the deck of the vessel 10. In addition, the vessel 10 may be a surface floating type as shown or it may be a semisubmersible vessel. The stinger 11 may be curved in a vertical plane as shown or straight as is currently the more common practice.

In operation, the pipelaying vessel 10 is moved along a predetermined pipeline route while the pipeline 12 is payed out over the stern of the vessel 10, along the pipe support structure 11 and thence onto the floor 13 of the body of water 14. The vessel 10 is preferably provided with a dynamic positioning system for controlling the vessel movement which includes rotatable thruster units 15 mounted fore and aft of the vessel 10 for controlling the heading lateral position, and forward progression along the route of the vessel 10. Alternatively, the vessel movement may be controlled by other combinations of thrusters both fixed and steerable or by a plurality of anchors (not shown) arranged around the vessel with controllable winches on each anchor line so that the anchor lines can be selectively reeled in and payed out to effect selective movement of the vessel 10 along a predetermined course and at a predetermined heading.

Figure 2:
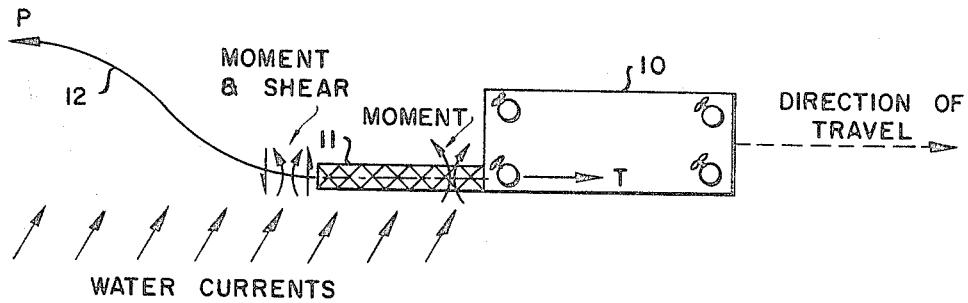
FIG. 2 is a plan view of the vessel showing the effect of sideways water currents acting on the pipeline and stinger when a laterally rigid stinger is used and the vessel is aligned with the pipeline route.
Figure 3:
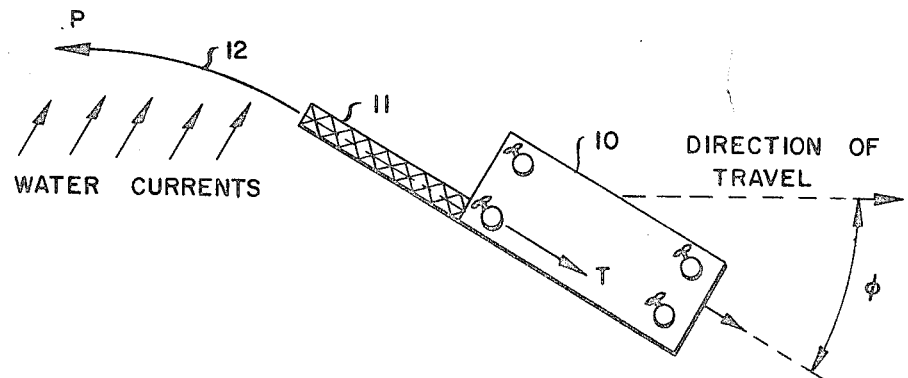
FIG. 3 is likewise a plan view of the pipelaying vessel with the heading of the vessel rotated in the direction of the sideways water currents to alleviate their adverse effect on the pipeline and on the laterally rigid pipe support structure.
Figure 4:
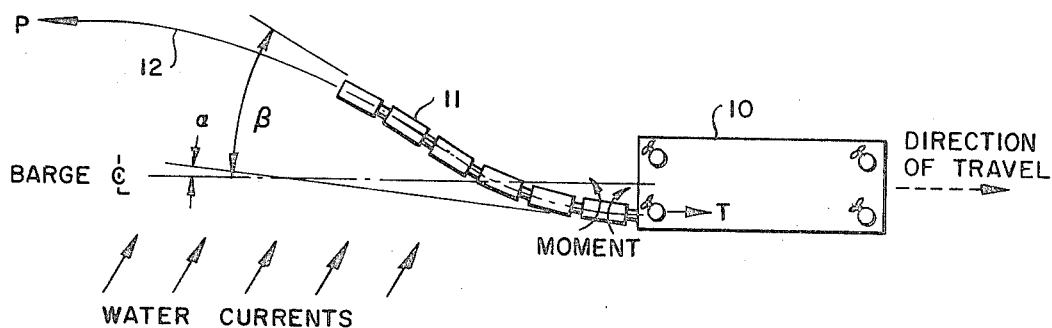
FIG. 4 is a plan view of the vessel showing the effects of sideways water currents acting on the pipeline and stinger when an elastically flexible hinged stinger is used and the vessel is aligned with the pipeline route.
Figure 5:
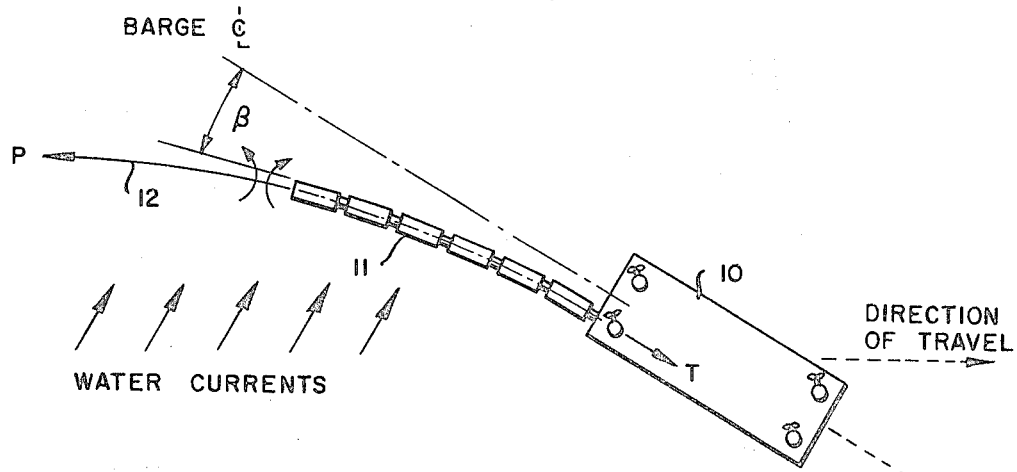
FIG. 5 is a plan view of the vessel of FIG. 4 with the heading of the vessel rotated in the direction of the sideways currents to alleviate their adverse affect on the pipeline and on the flexible stinger.

The pipe support structure may be laterally rigid, as is the conventional design practice, or it may incorporate elastically flexible joints, as described in the aforementioned U.S. Patent application Ser. No. 797,804, filed Feb. 10, 1969. FIGS. 2 and 3 relate to a laterally rigid support structure. FIGS. 4 and 5 relate to a laterally flexible support structure.

As can be seen in FIG. 2, cross currents or waves acting on the unsupported span of the pipeline 12 between the laterally rigid support structure 11 and the water floor 13 create transverse drag forces which cause undesirable loading in the form of shear loads and bending moments at the point where the pipeline 12 leaves the support structure 11. These loads not only tend to bend the pipeline 12 as shown in FIG. 2, but also act to produce large bending moments in the support structure 11 in the vicinity of its attachment to the stern of the vessel or so called "hitch."

FIG. 3 shows the vessel 10 turned by a certain angle $\phi$ from the direction of travel so that the bow of the vessel faces partially into the cross currents. This vessel heading tends to reduce both the moment in the pipe at the tip of the stinger and the bending moment in the stinger where it attaches to the vessel. For any pipe under tension contained in a laterally rigid stinger, it is possible to vary the vessel heading until the moment at the tip of the stinger is essentially zero. This vessel heading is optimum for protecting the pipe from overbending, but, the bending moments in the stinger may still be substantial. For a pipe which is stiff and/or under large tension, it is possible to further reduce the bending moment in the stinger by turning the barge still farther into the current. During this additional turning, however, the moment in the pipe at the tip of the stinger will reverse directions from that shown in FIG. 2 and will eventually at some angle become excessive. The optimum vessel heading for a laterally rigid stinger lies between these two headings.

Figure 6:
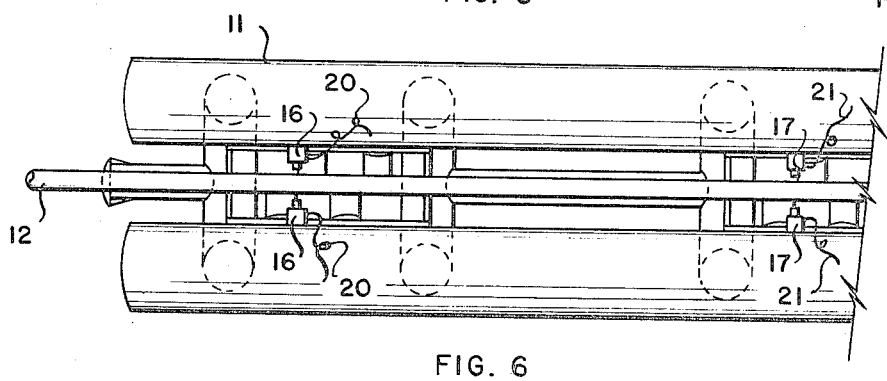
FIGS. 6 and 7 are detailed plan views of a portion of the apparatus of FIG. 1.
Figure 7:
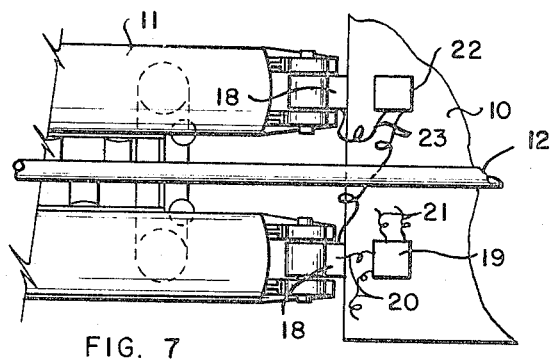

The two simplest measurements which can be monitored and used to determine the optimum vessel heading for a laterally rigid stinger are (1) the reaction force between the pipe and the stinger at the tip of the stinger, and (2) the bending moment in the stinger at its attachment to the vessel. The former measurement indicates impending damage to the pipe; the latter indicates impending damage to the stinger. Another measurement (3), which may be used in conjunction with or as a replacement for measurement (1), is the bending moment applied by the stinger structure to the pipe at the tip of the stinger. Measurement (1) can be accomplished by instrumenting the last set of pipe support rollers at the stinger tip with load cells or force transducers 16 as shown in FIG. 6 which would indicate the direction and magnitude of the lateral force existing between the pipe and the stinger at this point. A suitable indicator 19, FIG. 7 on the deck of the barge 10 may be employed to display the signals generated by the load cells 16. The indicator 19 and the load cells 16 are operatively connected by wires 20 or hoses depending on whether the load cells 16 are electrical or hydraulic. Measurement (3) of the bending moment applied to the pipe at the stinger tip requires that the set of pipe support rollers second from the tip also be similarly instrumented with load cells or force transducers 17, FIG. 6, connected to indicator 19 by means of wires or hoses 21. Measurement (2), the bending moment in the stinger at the attachment point or hitch can be accomplished by mounting one or more force transducers 18 as shown in FIG. 7 to measure the forces between the stinger 11 and the vessel 10 at the point of attachment of the stinger to the vessel. The force transducers 18 are connected to an on-board indicator 22 by wires or hoses 23 to display the signal generated by the force transducers 18.

The above system for orienting a vessel equipped with a laterally rigid stinger can be used with the long straight buoyant stingers in common use as well as with the newer shorter curved stingers as shown. When used in shallow water, the extreme length of the straight stingers and the relatively short length of the span of unsupported pipe cause a small misalignment of the pipelaying vessel to create very large shear loads and bending moments in the pipeline and the stinger even in the absence of any side currents. If uncorrected this misalignment may cause the pipeline to be dumped out of the stinger with resultant damage to both the pipeline and the stinger itself.

The aforementioned application Ser. No 797,804, filed Feb. 10, 1969, describes a stinger which consists of several identical segments connected in series by elastically flexible hinges. This stinger is much freer to bend laterally and requires somewhat different instrumentation and vessel heading control than the laterally rigid stinger described above. As shown in FIG. 4, side currents deflect the pipe 12 and flexible stinger 11 downstream from the lay vessel. This is similar to the behavior of the pipe and rigid stinger shown in FIG. 2, except that the flexible stinger 11 is better able to conform to the curve assumed by the pipe 12. As a result the moment in the pipe 12 at the tip of the stinger is greatly reduced and the shear load is transferred to the stinger at a point much closer to the point of attachment of the stinger 11 to the vessel 10 thereby reducing the moment in the stinger at this point. This moment deflects the elastic hinge at the point of attachment or hitch, developing the angle $\alpha$ shown in FIG. 4 and thus creating a bending moment in the pipe at the point of attachment.

If the vessel heading is rotated into the current until the vessel is aligned with the inboard end of the stinger as shown in FIG. 5 $\alpha$ becomes zero and the bending moments in the pipe and the stinger at the hitch are eliminated. In the configuration shown in FIG. 5, the pipeline acts as a semiflexible tensile member wherein the current drag forces are supported by the tension T applied to the pipe at its inboard end and the shear force is transferred directly to the vessel near the hitch. Under these conditions bending stresses in the pipe and the stinger near the hitch are at a minimum. An appreciable bending moment may, however, exist in the pipe 12 at the tip of the stinger due to the current drag forces on the stinger which are transferred to the curved pipe within the stinger 11 and due to the forces required to bend the elastically flexible stinger into the curved position shown in FIG. 5. If this bending moment becomes excessive during certain conditions of operation, it can be reduced somewhat by accepting some bending forces at the point of attachment of the stinger 11 to the vessel 10. Analysis shows that at some vessel heading intermediate between the headings shown in FIGS 4 and 5 before the angle $\alpha$ is reduced completely to zero, the angle $\beta$ between the centerline of the vessel and the centerline of the last stinger segment will pass through zero. Within the angular vicinity of this point, a near optimum compromise between bending moments at the hitch and bending moments at the tip can be achieved. Whether it is desirable to maintain a vessel heading where $\alpha$ is equal to zero or one where $\beta$ is equal to zero depends on the characteristics of the stinger and the size and weight of the pipe being layed. Any suitable means of measuring the angles $\alpha$ and $\beta$ can be used to display the appropriate angle to a helmsman whose duty it is to maintain an appropriate vessel heading, or the angle information may be fed directly into a closed loop controller which maintains the proper heading by controlling the output of the thrusters of a dynamic positioning system or the winches of an anchoring system as disclosed in U.S. patent application Ser. No. 755,304, filed Aug. 26, 1968.

A load cell or force transducer mounted to measure the direction and magnitude of the force between the pipe and the tip of the stinger can provide valuable additional information and under certain conditions could conceivably be used as the controlled variable to be maintained at a selected value by the helmsman or the automatic control system.

The operation of the system shown in FIGS. 4 and 5 is similar to that described with reference to FIGS. 1–3. While the appropriate vessel heading is maintained the vessel 10 is moved along the route or direction of travel as shown in FIGS. 1 and 5. The direction of travel that the vessel follows may be maintained by a helmsman following preplaced navigational aids such as buoys or by means of an automatic control system such as that described in the aforementioned application Ser. No. 755,304, filed Aug. 26, 1968.

It is intended that the subject invention may be practiced with different types of pipelaying vessels and stinger designs known in the art without departing from the scope of the appended claims.

We claim:

1. A method of laying a pipeline along a preselected route on the floor of a body of water from a pipelaying vessel having a laterally rigid pipe supporting structure extending outboard of said vessel for directing said pipeline into said water wherein said pipeline is subjected to transverse water forces producing drag forces in a horizontal plane with respect to the surface of said body of water on said pipeline, said method comprising:

determining any loads imposed on said pipe supporting structure by said pipeline when said pipeline is subjected to said water forces;

partially rotating the vessel heading in the direction of said water forces in order to reduce the loads imposed on said structure by said pipeline and thus to simultaneously reduce the bending stress in said structure induced by said drag forces acting on said pipeline; and moving said vessel, at least periodically along said preselected route, while maintaining said vessel heading partially rotated.

2. A method of laying a pipeline as defined in claim 1 wherein the step of determining said loads includes the step of determining the drag forces imposed on said pipe supporting structure near its outer end by said pipeline.

3. A method of laying a pipeline as defined in claim 1 wherein the step of determining said loads includes the step of determining the bending moment imposed on said pipe supporting structure near its outer end by said pipeline.

4. A method of laying a pipeline as defined in claim 2 wherein the step of determining said loads further includes the step of determining the bending moment near the inboard end of the pipe supporting structure.

5. A method of laying a pipeline as defined in claim 1 wherein the step of determining said loads includes the step of determining both the drag forces and the bending moment imposed on said pipe supporting structure near its outer end by said pipeline.

6. A method of laying a pipeline as defined in claim 5 wherein the step of determining both the forces and the bending moment includes the step of further determining the bending moment near the inboard end of the pipe supporting structure.

7. A method of laying pipeline as defined in claim 1 including the step of rotating said vessel heading sufficiently to substantially eliminate the stress in said structure induced by said drag forces acting on said pipeline.

8. A method of laying pipeline as defined in claim 7 wherein the step of rotating said vessel heading to substantially eliminate stress includes the step of rotating said vessel heading a distance sufficient to reverse the bending moment in said pipeline at the tip of said support structure thereby permitting said pipeline to apply to said supporting structure a moment acting to reduce the bending moment induced in said supporting structure by said drag forces acting on said pipeline and on said supporting structure.

9. A method of laying a pipeline along a preselected route on the floor of a body of water from a pipelaying vessel having a hinged, segmented laterally-flexible pipe supporting structure extending outboard of said vessel for directing said pipeline into said water wherein said pipeline is subjected to transverse water forces producing drag forces on said pipeline and said structure in a horizontal plane with respect to the surface of said body of water, said method comprising:

determining the bending moment on the support structure due to said transverse water forces at the point where the support structure attaches to the stern of the pipe laying vessel when said pipeline is subjected to said water forces;

partially rotating the vessel heading in the direction of said water forces to substantially reduce the measured bending moment at the point where the support structure attaches to the stern of said vessel; and moving said vessel at least periodically along said preselected route while maintaining said vessel heading partially rotated.

10. A method of laying a pipeline along a preselected route on the floor of a body of water from a pipelaying vessel having a laterally rigid pipe supporting structure extending outboard of said vessel for directing said pipeline into said water, said method comprising:

determining any loads occurring in a horizontal plane with respect to the surface of said body of water imposed on said pipe supporting structure by said pipeline as said pipeline is being laid from said vessel;

partially rotating the vessel heading in a direction adapted to reduce any loads imposed on said structure by said pipeline and thus to simultaneously reduce the bending stress in said structure induced by any of said loads acting on said pipeline; and moving said vessel, at least periodically along said preselected route, while maintaining said vessel heading partially rotated.

References Cited

UNITED STATES PATENTS 3,438,213   4/1969   Broussard et al. _____ 61—72.3

FOREIGN PATENTS 1,300,292   6/1962   France _____ 114—235

JACOB SHAPIRO, Primary Examiner

U.S. Cl. X.R.

114—235